US012583949B2

(12) United States Patent
Roos et al.

(10) Patent No.: US 12,583,949 B2
(45) Date of Patent: Mar. 24, 2026

(54) CATALYTIC SYSTEM FOR THE STEREOSPECIFIC POLYMERIZATION OF DIENES AND USE THEREOF IN A PROCESS FOR SYNTHESIZING DIENE POLYMERS

(71) Applicants: COMPAGNIE GENERALE DES ETABLISSEMENTS MICHELIN, Clermont-Ferrand (FR); Centre National De La Recherche Scientifique (CNRS), Paris (FR); Institut Polytechnique De Bordeaux, Talence (FR); Universite De Bordeaux, Bordeaux (FR)

(72) Inventors: Kevin Roos, Clermont-Ferrand (FR); Stephane Carloti, Pessac (FR); Pierre-Antoine Forens, Bruges (FR); Benoit Gadenne, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 79 days.

(21) Appl. No.: 18/014,618

(22) PCT Filed: Jul. 6, 2021

(86) PCT No.: PCT/FR2021/051246
§ 371 (c)(1),
(2) Date: Jan. 5, 2023

(87) PCT Pub. No.: WO2022/008838
PCT Pub. Date: Jan. 13, 2022

(65) Prior Publication Data
US 2023/0272128 A1 Aug. 31, 2023

(30) Foreign Application Priority Data
Jul. 7, 2020 (FR) ...................................... 2007171

(51) Int. Cl.
| | |
|---|---|
| C08F 4/56 | (2006.01) |
| C08F 2/60 | (2006.01) |
| C08F 36/04 | (2006.01) |
| C08F 136/06 | (2006.01) |

(52) U.S. Cl.
CPC ................ C08F 4/565 (2013.01); C08F 2/60 (2013.01); C08F 136/06 (2013.01); C08F 2410/04 (2013.01)

(58) Field of Classification Search
CPC .......... C08F 4/565; C08F 2/60; C08F 136/06; C08F 2410/04; C08F 36/04
See application file for complete search history.

(56) References Cited

U.S. PATENT DOCUMENTS

| | | | |
|---|---|---|---|
| 4,446,290 | A | 5/1984 | Kematu et al. |
| 4,996,273 | A | 2/1991 | Van Der Huizen |
| 6,359,088 | B1 | 3/2002 | Halasa et al. |
| 6,627,715 | B2 | 9/2003 | Halasa et al. |
| 6,800,582 | B2 | 10/2004 | Favrot et al. |
| 2002/0045720 | A1 | 4/2002 | Halasa et al. |
| 2003/0153698 | A1 | 8/2003 | Halasa et al. |
| 2003/0195309 | A1 | 10/2003 | Favrot et al. |

FOREIGN PATENT DOCUMENTS

| | | |
|---|---|---|
| DE | 102017002966 A1 | 10/2018 |
| EP | 0061902 A1 | 10/1982 |
| EP | 1018521 A1 | 7/2000 |
| EP | 1285932 A2 | 2/2003 |
| GB | 2342096 A | 4/2000 |

OTHER PUBLICATIONS

F. Vilmin, et al., "Fast and Robust Method for the Determination of Microstructure and Composition in Butadiene, Styrene-Butadiene, and Isoprene Rubber by Near-Infrared Spectroscopy", Appl. Spectroscopy, vol. 60, No. 6, pp. 619-630 (2006).
A.M. Johns, et al., "Solution Interaction of Potassium and Calcium Bis(trimethylsilyl)amides; Preparation of Ca[N (SiMe3)2]2 from Dibenzylcalcium", Inorg. Chem. 2009, 48, 1380-1384.
R. Fujio, et al., "Copolymerization of Butadiene and Styrene with n-Butyllithium and Alkaline-Earth Metal Compound Mixture", Nippon Kagaku Kaishi, vol. 1972, No. 2, pp. 447-453 (1972) with English abstract.
International Search Report dated Oct. 23, 2021, in corresponding PCT/FR2021/051246 (6 pages).

(Continued)

*Primary Examiner* — Catherine S Branch
(74) *Attorney, Agent, or Firm* — VENABLE LLP

(57) ABSTRACT

A bimetallic catalytic system consists of the metallic components of formulae RLi and $Ca(AR'_y)_2(L)_x$ in which: R represents a substituted or unsubstituted $C_1$-$C_{10}$ aliphatic radical, a substituted or unsubstituted $C_6$-$C_{20}$ aromatic radical or a substituted or unsubstituted $C_1$-$C_{10}$ heteroaliphatic radical; A denotes N or C; y has the value 2 when A is N and the value 3 when A is C; each R' represents a hydrogen atom, a substituted or unsubstituted $C_5$-$C_{10}$ aliphatic radical, a substituted or unsubstituted $C_6$-$C_{20}$ aromatic radical, a substituted or unsubstituted silyl radical, a $C_1$-$C_{10}$ aliphatic radical substituted by at least one substituted or unsubstituted silyl radical, a $C_6$-$C_{20}$ aromatic radical substituted by at least one substituted or unsubstituted silyl radical; L represents a ligand; and x is a number ranging from 0 to 4.

14 Claims, No Drawings

(56) References Cited

OTHER PUBLICATIONS

C. Lichtenberg, et al., "Cationic, Neutral, and Anionic Allyl Magnesium Compounds: Unprecedented Ligand Conformations and Reactivity Toward Unsaturated Hydrocarbons", J. Am. Chem. Soc., vol. 135, No. 2, pp. 811-821 (2013).

CATALYTIC SYSTEM FOR THE STEREOSPECIFIC POLYMERIZATION OF DIENES AND USE THEREOF IN A PROCESS FOR SYNTHESIZING DIENE POLYMERS

TECHNICAL FIELD

The present invention relates to a catalytic system for the stereospecific polymerization of conjugated dienes promoting the trans-1,4 insertion of the monomers. The invention relates more particularly to a polymetallic catalytic system for the stereospecific polymerization of conjugated dienes promoting the trans-1,4 insertion of the monomers. The invention also relates to a process for the synthesis of diene polymers having a high content of trans-1,4 sequences using a polymetallic catalytic system for the polymerization of the monomers.

PRIOR ART

The use of polymetallic catalytic systems for the stereospecific polymerization of diene monomers for manufacturing diene polymers having a high content of trans-1,4 sequences has been described in the past.

It has been shown in the past that bimetallic catalytic systems for the synthesis of diene polymers could have an impact on the content of trans-1,4 sequences of the diene polymers synthesized. Nevertheless, as the literature shows, it turns out that certain systems result in the absence of activity of the catalytic system in forming polymers having a higher trans content than that obtained with a conventional monometallic system, such as an alkyllithium. For example, "Copolymerization of Butadiene and Styrene with n-Butyllithium and Alkaline-Earth Metal Compound Mixture," *Nippon Kagaku Kaishi*, Vol. 1972, No. 2, pp. 447-453, 1972, describes syntheses of SBR with initiation by an alkyllithium and a cocatalyst of alkoxides of an alkaline earth metal. It may be seen that calcium carboxylates and alkoxides have a negative effect on the content of trans-1,4 sequences since this content is lower than that observed for an SBR obtained with the alkyllithium initiator used alone, without cocatalyst.

The Applicant Company has provided, in EP 1 018 521 A1, a process for the synthesis of diene polymers exhibiting a content of trans-1,4 sequences of greater than 70% by weight using a trimetallic lithiated catalytic system for the initiation of the polymerization of 1,3-diene monomers. The catalytic system used comprised an organolithium polymerization initiator and two metallic cocatalysts, one being a compound of a metal from column 13 of the Periodic Table of the Elements, in particular aluminum, and the other being a compound of an alkaline earth metal, in particular strontium and barium. Each constituent of this trimetallic system has a direct influence on the characteristics of the product and of its synthesis, in particular the reaction kinetics, and also on the microstructure and the macrostructure of the diene polymer. Precise management of the metallic constituents is required for the control and the reproducibility of the process and of its product.

While catalytic systems employed in stereospecific polymerizations of conjugated dienes have already been described in the past, a need remains to have available effective processes for the synthesis of stereoregular trans-1,4 diene polymers exhibiting a high content of trans-1,4 sequences, that is to say greater than those obtained with a conventional polymerization initiator used alone, of organolithium type. There exists a need to access such diene polymers with easier control of the process in comparison with the existing processes.

DISCLOSURE OF THE INVENTION

The technical problem addressed in the context of the present invention is that of having available a process for the synthesis of diene polymers exhibiting a stereospecificity with regard to the trans-1,4 insertion of conjugated diene monomers, while ensuring easier management than existing processes making it possible to obtain stereoregular trans-1,4 diene polymers.

The invention makes it possible to solve this problem by providing a bimetallic catalytic system, combining an organic compound of an alkali metal with an organic calcium compound, for the polymerization of conjugated dienes exhibiting a stereospecificity with regard to the trans-1,4 insertion and ensuring satisfactory polymerization kinetics.

The use of the bimetallic catalytic system according to the invention in a process for the synthesis of a diene polymer makes possible simplified management of the process due to the bimetallic nature of the catalytic system, thus reducing the number of components directly influencing the characteristics of the process and of its product, while offering the possibility of obtaining stereoregular diene polymers exhibiting a higher content of trans-1,4 sequences than those obtained with a conventional initiation system based on an alkyllithium, which can reach, according to certain embodiments, values of the order of 70% by weight and more with respect to the diene part of the polymer.

In a first aspect, the invention relates to such a catalytic system.

In another aspect, the invention relates to a process for the synthesis of a diene polymer using such a catalytic system.

SUMMARY OF THE INVENTION

A subject matter of the invention, which invention is described in greater detail below, is at least one of the implementations listed in the following points:

1-Bimetallic catalytic system consisting of the metallic components of formulae RLi and $Ca(AR'_y)_2(L)_x$ in which:

R represents a substituted or unsubstituted $C_1$-$C_{10}$ aliphatic radical, a substituted or unsubstituted $C_6$-$C_{20}$ aromatic radical, a diene prepolymer or a substituted or unsubstituted $C_1$-$C_{10}$ heteroaliphatic radical, A denotes a nitrogen atom N or a carbon atom C, y depends on the valency of A; y has the value 2 when A is N and y has the value 3 when A is C, each R' represents, independently of one another, a hydrogen atom, a substituted or unsubstituted $C_5$-$C_{10}$ aliphatic radical, a substituted or unsubstituted $C_6$-$C_{20}$ aromatic radical, a substituted or unsubstituted silyl radical, a $C_1$-$C_{10}$ aliphatic radical substituted by at least one substituted or unsubstituted silyl radical, or a $C_6$-$C_{20}$ aromatic radical substituted by at least one substituted or unsubstituted silyl radical, L represents a ligand, x is a number ranging from 0 to 4.

2-Bimetallic catalytic system according to the preceding implementation, characterized in that the aliphatic radical, in the definition of R, is a substituted or unsubstituted $C_1$-$C_{10}$ alkyl radical.

3-Bimetallic catalytic system according to the preceding implementation, characterized in that the aliphatic radical, in the definition of R, is a $C_1$-$C_4$ alkyl radical chosen from a methyl, ethyl, n-propyl, isopropyl, isobutyl, n-butyl, s-butyl or tert-butyl, preferably s-butyl and n-butyl, radical.

4-Bimetallic catalytic system according to implementation 1, characterized in that the aromatic radical, in the definition of R, is a substituted or unsubstituted $C_6$-$C_{20}$ aryl radical.

5-Bimetallic catalytic system according to either one of implementations 1 or 4, characterized in that the aromatic radical, in the definition of R, is substituted by one or more substituents chosen independently from $C_1$-$C_{10}$ alkyls, $C_7$-$C_{12}$ aralkyls, $C_2$-$C_{10}$ alkenyls and $C_2$-$C_{10}$ alkynyls.

6-Bimetallic catalytic system according to implementation 1, characterized in that the diene prepolymer, in the definition of R, exhibits an Mn of at most 5000 g/mol.

7-Bimetallic catalytic system according to either one of implementations 1 or 6, characterized in that the diene prepolymer, in the definition of R, is a polyisoprene or a polybutadiene.

8-Bimetallic catalytic system according to implementation 1, characterized in that the heteroaliphatic radical, in the definition of R, comprises one or more heteroatoms chosen from nitrogen, silicon, oxygen, and the like, preferably nitrogen.

9-Bimetallic catalytic system according to the preceding implementation, characterized in that the heteroaliphatic radical, in the definition of R, is an acyclic or cyclic amine radical.

10-Bimetallic catalytic system according to the preceding implementation, characterized in that the heteroaliphatic radical, in the definition of R, is the radical derived from the following nitrogen compounds by the loss of the hydrogen atom bonded to the nitrogen atom: dimethylamine, diethylamine, dipropylamine, di(n-butyl)amine, di(sec-butyl)amine, dipentylamine, dihexylamine, di(n-octyl)amine, di(2-ethylhexyl) amine, dicyclohexylamine, N-methylbenzylamine, diallylamine, morpholine, piperazine, 2,6-dimethyl-morpholine, 2,6-dimethylpiperazine, 1-ethylpiperazine, 2-methylpiperazine, 1-benzylpiperazine, piperidine, 3,3-dimethylpiperidine, 2,6-dimethylpiperidine, 1-methyl-4-(methylamino)piperidine, 2,2,6,6-tetramethylpiperidine, pyrrolidine, 2,5-dimethylpyrrolidine, azetidine, hexamethyleneimine, heptamethyleneimine, 5-benzyloxyindole, 3-azaspiro[5.5]undecane, 3-azabicyclo[3.2.2]nonane, carbazole or bistrimethylsilylamine.

11-Bimetallic catalytic system according to the preceding implementation, characterized in that the heteroaliphatic radical, in the definition of R, is the radical derived from pyrrolidine or hexamethyleneimine by the loss of the hydrogen atom bonded to the nitrogen atom.

12-Bimetallic catalytic system according to the preceding implementation, characterized in that RLi is n-butyllithium or s-butyllithium.

13-Bimetallic catalytic system according to the preceding implementation, characterized in that the aliphatic $C_5$-$C_{10}$ radical, in the definition of R', is a $C_5$-$C_{10}$ alkyl radical.

14-Bimetallic catalytic system according to any one of the preceding implementations, characterized in that the aromatic radical, in the definition of R', is a $C_6$-$C_{20}$ aryl radical.

15-Bimetallic catalytic system according to any one of the preceding implementations, characterized in that the silyl radical, in the definition of R', is a substituted silyl radical.

16-Bimetallic catalytic system according to any one of the preceding implementations, characterized in that the silyl radical, in the definition of R', is a silyl radical substituted by at least one $C_1$-$C_5$ alkyl, $C_3$-$C_6$ cycloalkyl, $C_6$-$C_{10}$ aryl or $C_7$-$C_{12}$ aralkyl radical.

17-Bimetallic catalytic system according to any one of the preceding implementations, characterized in that the silyl radical, in the definition of R', is a silyl radical trisubstituted by three identical or different radicals chosen from $C_1$-$C_5$ alkyl, $C_3$-$C_6$ cycloalkyl, $C_6$-$C_{10}$ aryl or $C_7$-$C_{12}$ aralkyl radicals.

18-Bimetallic catalytic system according to any one of the preceding implementations, characterized in that the silyl radical, in the definition of R', is a silyl radical substituted by three $C_1$-$C_5$ alkyl radicals.

19-Bimetallic catalytic system according to any one of the preceding implementations, characterized in that the silyl radical, in the definition of R', is a trimethylsilyl, triethylsilyl or tripropylsilyl radical.

20-Bimetallic catalytic system according to any one of the preceding implementations, characterized in that R' is a silyl radical substituted by three $C_1$-$C_5$ alkyl radicals.

21-Bimetallic catalytic system according to any one of the preceding implementations, characterized in that R' is a trimethylsilyl, triethylsilyl or tripropylsilyl, preferably trimethylsilyl, radical.

22-Bimetallic catalytic system according to any one of the preceding implementations, in which A is a nitrogen atom and y has the value 2.

23-Bimetallic catalytic system according to any one of the preceding implementations, characterized in that R is a $C_1$-$C_4$ alkyl radical, A denotes a nitrogen atom and R' is a silyl radical substituted by three $C_1$-$C_5$ alkyl radicals.

24-Bimetallic catalytic system according to any one of the preceding implementations, characterized in that R is an n-butyl or s-butyl radical, A denotes a nitrogen atom and R' is a trimethylsilyl, triethylsilyl or tripropylsilyl, preferably trimethylsilyl, radical.

25-Bimetallic catalytic system according to any one of the preceding implementations, characterized in that the ligand L is chosen from ethers, amines, phosphates, thioethers, pyridines, bipyridines, phenanthrolines, imidazoles and amides.

26-Bimetallic catalytic system according to the preceding implementation, characterized in that the ligand L is a ether.

27-Bimetallic catalytic system according to the preceding implementation, characterized in that the ligand L is 1,2-dimethoxyethane, tetrahydrofuran or tetrahydropyran.

28-Bimetallic catalytic system according to any one of the preceding implementations, in which x has the value 0.

29-Bimetallic catalytic system according to any one of the preceding implementations, in which the molar ratio of $Ca(AR'_y)_2(L)_x$ to RLi (or of Ca to Li) is greater than 0, preferably at least 0.2.

30-Bimetallic catalytic system according to any one of the preceding implementations, in which the molar ratio of $Ca(AR'_y)_2(L)_x$ to RLi (or of Ca to Li) is less than or equal to 4.0.

31-Bimetallic catalytic system according to any one of the preceding implementations, in which the molar ratio of Ca(AR'$_y$)$_2$(L)$_x$ to RLi (or of Ca to Li) is greater than 0, preferably at least 0.2, and less than or equal to 2.0.

32-Bimetallic catalytic system according to any one of the preceding implementations, in which the molar ratio of Ca(AR'$_y$)$_2$(L)$_x$ to RLi (or of Ca to Li) is greater than 0, preferably at least 0.2, and at most 1.0, more preferably at least 0.2, and at most 0.8.

33-Process for the synthesis of a diene polymer, comprising a stage of anionic polymerization of at least one diene monomer in the presence of a bimetallic catalytic system according to any one of the preceding implementations.

34-Process according to the preceding implementation, characterized in that the diene monomer is a 1,3-diene monomer having from 4 to 8 carbon atoms.

35. Process according to the preceding implementation, characterized in that the diene monomer is 1,3-butadiene or isoprene, advantageously 1,3-butadiene.

36-Process according to any one of the preceding implementations 34 to 36, characterized in that the diene monomer is copolymerized with at least one other monomer.

37. Process according to the preceding implementation, characterized in that the diene monomer is copolymerized with at least one other monomer chosen from 1,3-diene monomers having from 4 to 8 carbon atoms.

38-Process according to implementation 37 or 38, characterized in that the diene monomer is copolymerized with at least one other monomer chosen from vinylaromatic compounds, preferably styrene.

39-Process according to any one of the preceding implementations 34 to 39, characterized in that at least 1,3-butadiene is polymerized in the presence of a bimetallic catalytic system consisting of the metallic components of formulae RLi and Ca(AR'$_y$)$_2$(L)$_x$ in which at least one, at least two, at least three, preferably all, of the following characteristics are observed:

R represents an n-butyl or s-butyl, preferably s-butyl, radical,

A represents a nitrogen atom N and y has the value 2, and

R' is a trimethylsilyl, triethylsilyl or tripropylsilyl, preferably trimethylsilyl, radical, the Ca/Li molar ratio is at least 0.2 and at most 1.0, preferably at most 0.8.

Definitions

The terms "radical" and "group", in the singular or in the plural, are equivalent and interchangeable.

The expression "C$_x$-C$_y$," for a hydrocarbon radical means that said radical comprises from x to y carbon atoms.

In the present document, unless expressly indicated otherwise, all the percentages (%) indicated are percentages (%) by weight. The percentages (%) expressing the microstructure of the diene polymer (for example the relative distribution of the 1,2, trans-1,4 and cis-1,4 butadiene units) are percentages by weight, with respect to the diene part of the polymer. Thus, a content of trans-1,4 sequences of more than 70% in a diene polymer corresponds to a content of trans-1,4 diene units of more than 70% by weight, with respect to the weight of the diene part of the polymer.

Furthermore, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

In the present description, the term "bimetallic catalytic system" is understood to mean a catalytic system in which there are two metallic components. The bimetallic catalytic system does not contain other metallic components apart from those of formulae RLi and Ca(AR'$_y$)$_2$(L)$_x$.

The compounds comprising carbon mentioned in the description can be of fossil or biobased origin. In the latter case, they can, partially or completely, result from biomass or be obtained from renewable starting materials resulting from biomass. This in particular concerns polymers, monomers, plasticizers, fillers, and the like.

Thus, for example, the butadiene can advantageously result, in a known way, directly from biomass or be obtained from a biobased precursor, for example biobased ethanol. The isoprene can advantageously result, in a known way, directly from biomass or be obtained from a biobased precursor, for example from biobased isobutene.

DETAILED DESCRIPTION OF THE INVENTION

A subject matter of the invention is a bimetallic catalytic system consisting of the metallic components of formulae RLi and Ca(AR'$_y$)$_2$(L)$_x$ in which:

R represents a substituted or unsubstituted C$_1$-C$_{10}$ aliphatic radical, a substituted or unsubstituted C$_6$-C$_{20}$ aromatic radical, a diene prepolymer or a substituted or unsubstituted C$_1$-C$_{10}$ heteroaliphatic radical, A denotes a nitrogen atom or a carbon atom, y depends on the valency of A; y has the value 2 when A is N and y has the value 3 when A is C, each R' represents, independently of one another, a substituted or unsubstituted C$_5$-C$_{10}$ aliphatic radical, a substituted or unsubstituted C$_6$-C$_{20}$ aromatic radical, a substituted or unsubstituted silyl radical, a C$_1$-C$_{10}$ aliphatic radical substituted by a substituted or unsubstituted silyl radical, a C$_6$-C$_{20}$ aromatic radical substituted by a substituted or unsubstituted silyl radical, L represents an inert ligand, x is a number ranging from 0 to 4.

In the formula RLi, R can be a substituted or unsubstituted C$_1$-C$_{10}$ aliphatic radical. Mention may be made, as aliphatic radical representing R, of C$_1$-C$_{10}$ alkyl groups, C$_2$-C$_{10}$ alkenyl groups and C$_2$-C$_{10}$ alkynyl groups, whether cyclic or acyclic. Particularly, when R is an aliphatic radical, R is an acyclic C$_1$-C$_4$ alkyl radical chosen from a methyl, ethyl, n-propyl, isopropyl, isobutyl, n-butyl, s-butyl or tert-butyl, preferably n-butyl or s-butyl, preferably n-butyl, radical.

In the formula RLi, R can be a substituted or unsubstituted C$_6$-C$_{20}$ aromatic radical. Mention may be made, as aromatic radical representing R, of C$_6$-C$_{20}$ aryl groups.

In the formula RLi, R can be a substituted or unsubstituted C$_1$-C$_{10}$ heteroaliphatic radical. The radical is aliphatic as defined above and then comprises one or more heteroatoms chosen from nitrogen, silicon and oxygen; particularly, the aliphatic radical comprises one or more nitrogen atoms. Mention may be made, among the heteroaliphatic radicals comprising one or more nitrogen atoms, of the radicals derived from acyclic or cyclic amines, among which may be mentioned dimethylamine, diethylamine, dipropylamine, di(n-butyl)amine, di(sec-butyl)amine, dipentylamine, dihexylamine, di(n-octyl)amine, di(2-ethylhexyl)amine, dicyclohexylamine, N-methylbenzylamine, diallylamine, morpholine, piperazine, 2,6-dimethylmorpholine, 2,6-dimethylpiperazine, 1-ethylpiperazine, 2-methylpiperazine, 1-benzylpiperazine, piperidine, 3,3-dimethylpiperidine, 2,6-dimethylpiperidine, 1-methyl-4-(methylamino)piperidine, 2,2,6,6-tetramethylpiperidine, pyrrolidine, 2,5-dimethylpyrrolidine, azetidine, hexamethyleneimine, heptamethyleneimine, 5-benzyloxyindole, 3-azaspiro[5.5]undecane, 3-azabicyclo[3.2.2]nonane, carbazole, bistrimethylsilylamine. These radicals are derived from acyclic or cyclic amines by the loss of the hydrogen atom bonded to the nitrogen atom. More particularly, when R is a heteroaliphatic $C_1$-$C_{10}$ radical, R is chosen from the radicals derived from pyrrolidine and hexamethyleneamine. The LiR compounds with R representing a radical derived from an acyclic or cyclic amine are known to a person skilled in the art under the name "lithium amides", in particular in the context of the anionic polymerization of conjugated dienes.

In the formula RLi, R can be a diene prepolymer. The term "diene prepolymer" is understood to mean particularly a polymer of at least one diene monomer exhibiting a number-average molar mass of at most 5000 g/mol. Such a polymer can be a homopolymer of a diene monomer, particularly a conjugated diene monomer, in particular any homopolymer obtained by polymerization of a conjugated diene monomer having from 4 to 12 carbon atoms. Suitable as conjugated dienes are in particular 1,3-butadiene and isoprene. Such a polymer can also be a copolymer obtained by copolymerization of one or more diene monomers with one another or with one or more ethylenically unsaturated monomers. Suitable as ethylenically unsaturated monomers are in particular vinylaromatic compounds having from 8 to 20 carbon atoms, more particularly styrene.

Such a prepolymer can be obtained, in a known manner, by the anionic polymerization of at least one diene monomer initiated by an organolithium compound.

The diene prepolymer, in the definition of R, can be a polybutadiene or a polyisoprene.

According to specific embodiments of the invention, RLi is n-butyllithium or s-butyllithium.

In the formula $Ca(AR'_y)_2(L)_x$, the $(AR'_y)$ radicals of Ca have a lipophilic nature, in order for the catalytic system to be soluble in an organic medium. In the absence of this lipophilic nature of the radicals, it would be difficult to dissolve the component $Ca(AR'_y)_2(L)_x$ of the catalytic system in the organic medium in which diene monomers are generally polymerized in solution. The lack of solubility of the catalytic system in such an organic medium can lead to a drop in the catalytic activity and in particular a drop in the stereospecificity of the catalytic system with respect to the trans-1,4 insertions of the conjugated diene monomers during the synthesis of diene polymers.

In the formula $Ca(AR'_y)_2(L)_x$, R' can be a substituted or unsubstituted aliphatic $C_5$-$C_{10}$ radical. Mention may be made, as aliphatic radical representing R, of cyclic or acyclic $C_5$-$C_{10}$ alkyl, $C_5$-$C_{10}$ alkenyl and $C_5$-$C_{10}$ alkynyl groups.

In the formula $Ca(AR'_y)_2(L)_x$, R' can be a substituted or unsubstituted aromatic $C_6$-$C_{20}$ radical. Mention may be made, as aromatic radical representing R, of $C_6$-$C_{20}$ aryl groups.

In the formula $Ca(AR'_y)_2(L)_x$, R' can be a substituted or unsubstituted silyl radical. The substituted silyl radical can be mono-, di- or trisubstituted. The substituents of the silyl group can be independently chosen from $C_1$-$C_5$ alkyl, $C_6$-$C_{10}$ aryl (e.g., phenyl or naphthyl) or $C_7$-$C_{12}$ aralkyl radicals. Examples of monosubstituted silyl groups include ($C_1$-$C_5$ alkyl)silyls (e.g., methylsilyl) and arylsilyls (e.g., phenylsilyl). Examples of disubstituted silyl groups include di($C_1$-$C_5$ alkyl)silyls (e.g., dimethylsilyl) and diarylsilyls (e.g., diphenylsilyl). Examples of trisubstituted silyl groups include tri($C_1$-$C_5$ alkyl)silyls (e.g., trimethylsilyl, triethylsilyl, tripropylsilyl), triarylsilyls (e.g., triphenylsilyl, trinaphthylsilyl, tritolylsilyl), silyls substituted by alkyl and aryl radicals (e.g., dimethylphenylsilyl, methyldiphenylsilyl).

In the formula $Ca(AR'_y)_2(L)_x$, R' can be an aliphatic $C_1$-$C_{10}$ radical substituted by at least one substituted or unsubstituted silyl radical. Mention may be made, as aliphatic radical, of $C_1$-$C_{10}$ alkyl groups, $C_2$-$C_{10}$ alkenyl groups and $C_2$-$C_{10}$ alkynyl groups, whether cyclic or acyclic. The silyl radical is as described above. Particularly, when the aliphatic radical is an acyclic $C_1$-$C_4$ alkyl radical and the silyl radical is a trisubstituted silyl radical, R' can be chosen from tri($C_1$-$C_5$ alkyl)silylalkyl radicals, such as (trimethylsilyl)methylene, (trimethylsilyl)ethylene, 1-(trimethylsilyl)propylene, and the like.

In the formula $Ca(AR'_y)_2(L)_x$, R' can be a substituted or unsubstituted aromatic $C_6$-$C_{20}$ radical; the aromatic radical and the silyl radical are as described above.

The (hetero)aliphatic or aromatic radical defining R and the aliphatic or aromatic radical defining R' can be substituted, for example, by one or more substituents chosen in particular from $C_6$-$C_{10}$ aryl groups and silyl groups, which are substituted or substituted, as is defined above. The aromatic radical defining R and the aromatic radical defining R' can additionally or alternatively be substituted by one or more substituents chosen independently from $C_1$-$C_{10}$ alkyl, $C_2$-$C_{10}$ alkenyl, $C_2$-$C_{10}$ alkynyl and $C_7$-$C_{12}$ aralkyl groups.

According to certain specific embodiments of the invention, R' is a silyl radical substituted by three $C_1$-$C_5$ alkyl radicals.

According to certain specific embodiments of the invention, R' is a trimethylsilyl, triethylsilyl or tripropylsilyl, preferably trimethylsilyl, radical.

According to certain specific embodiments of the invention, the catalytic system is such that R represents a $C_1$-$C_4$ alkyl radical, A represents a nitrogen atom and R' is a silyl radical substituted by three $C_1$-$C_5$ alkyl radicals.

According to certain specific embodiments of the invention, the catalytic system is such that R represents an n-butyl or s-butyl, preferably s-butyl, radical, A represents a nitrogen atom and R' is a trimethylsilyl, triethylsilyl or tripropylsilyl, preferably trimethylsilyl, radical.

The ligand L is generally a hindered ligand chosen from Lewis bases and results from the synthesis of the alkaline earth metal complex. The ligand L can be chosen from ethers, amines, phosphates, thioethers, pyridines, bipyridines, phenanthrolines, imidazoles and amides. Examples of ethers include diethyl ether, 1,2-diethoxyethane, 1,2-di(n-propoxy)ethane, 1,2-di(n-butoxy)ethane, tetrahydrofuran, dioxane and tetrahydropyran. Examples of amines include the compounds of the family of the trialkylamines and aromatic amines, such as pyridine or piperazine and its derivatives. An example of phosphate includes tri(n-butyl) phosphate. Examples of thioethers include the compounds of the family of the dialkyl sulfides, such as dimethyl sulfide.

x may or may not be an integer. A person skilled in the art will understand that the number x, corresponding to the number of L present in the alkaline earth metal complex, depends on the mode of preparation of the complex. This number varies from 0 to 4.

According to certain particularly advantageous embodiments, the bimetallic catalytic system exhibits at least one, at least two and preferably all of the following characteristics:

R represents a $C_1$-$C_4$ alkyl radical, preferably n-butyl or s-butyl,

A represents a nitrogen atom and y has the value 2, and each R' represents a silyl radical substituted by three $C_1$-$C_5$ alkyl radicals; preferably, R' is trimethylsilyl, triethylsilyl or tripropylsilyl.

Furthermore, a person skilled in the art will understand that the component $Ca(AR'_y)_2(L)_x$ may not be in a unitary form in the catalytic system but in an agglomerated form forming a crystal unit cell. Thus, at the scale of this unit cell, it is possible for the latter to share some molecules, whether Ca, $(AR'_y)$ or L, with one or more other unit cells.

In the bimetallic catalytic system according to the invention, the molar ratio of $Ca(AR'_y)_2(L)_x$ to RLi (or of Ca to Li) is greater than 0 since the cocatalyst $Ca(AR'_y)_2(L)_x$ is always present in the system. Although it is possible to envisage using a catalytic system according to the invention with a molar ratio of $Ca(AR'_y)_2(L)_x$ to RLi of greater than 4.0, the molar ratio of $Ca(AR'_y)_2(L)_x$ to RLi is preferably less than or equal to 4.0. This is because, beyond this value of 4.0, when the catalytic system is used for the polymerization of conjugated dienes, the content of trans-1,4 sequences in the polymer obtained no longer increases and the kinetics of the polymerization reaction are degraded. Preferably, the molar ratio of $Ca(AR'_y)_2(L)_x$ to RLi is less than or equal to 2.0, more preferably less than or equal to 1.0, because the maximum content of trans-1,4 sequences has already been reached and a pointless overconsumption of component $Ca(AR'_y)_2(L)_x$ would adversely affect the productivity of the synthesis of the polymers.

According to certain specific embodiments of the invention, the molar ratio of $Ca(AR'_y)_2(L)_x$ to RLi is preferably at least 0.2 when the bimetallic catalytic system is used for the polymerization of conjugated dienes, in order to obtain a higher content of trans-1,4 sequences than that obtained with an initiation of the polymerization with RLi alone, all other things being equal.

According to certain specific embodiments of the invention, the molar ratio of $Ca(AR'_y)_2(L)_x$ to RLi is at least 0.2 and at most 1.0, more preferentially at least 0.2 and at most 0.8. In these intervals of values, when the bimetallic catalytic system is used for the polymerization of conjugated dienes, a higher content of trans-1,4 sequences can be observed than that obtained with an initiation of the polymerization with RLi alone, all other things being equal, in particular varying between the content obtained with RLi alone and 80%.

The RLi compounds can be manufactured in a known manner. RLi compounds are also commercially available, for example n-butyllithium, s-butyllithium or tert-butyllithium.

The $Ca(AR'_y)_2(L)_x$ compounds can, for example, be in the following manner.

For the synthesis of $Ca(NR'2)_2(L)_x$, R' denoting a substituted silyl radical, reference may be made to the process of synthesis described in A. M. Johns, S. C. Chmely and T. P. Hanusa, "Solution Interaction of Potassium and Calcium Bis(trimethylsilyl)amides; Preparation of $Ca[N(SiMe_3)_2]_2$ from Dibenzylcalcium," *Inorg. Chem.*, Vol. 48, No. 4, pp. 1380-1384, 2009. Thus, one reaction route involves the reaction, at ambient temperature, of benzylpotassium with the alkaline earth metal iodide in an organic solvent, such as THF, resulting in the formation of dibenzyl(alkaline earth metal). Benzylpotassium is obtained beforehand by metallation of toluene in the presence of a superbase. The dibenzyl (alkaline earth metal) is reacted with bis(trimethylsilyl)

amine (or HMDS) and produces calcium bis(trimethylsilyl) amide $(Ca(HMDS)_2)$, which is soluble in an organic solvent, such as toluene.

For the synthesis of $Ca(CR'_3)_2(L)_x$, R' denoting a substituted silyl radical, reference may be made to the process of synthesis described in DE102017002966A1.

Thus, for example, the bimetallic catalytic system according to the invention can consist of n-butyllithium or s-butyllithium and $Ca(HMDS)_2$.

The bimetallic catalytic system according to the invention can advantageously be used in a process for the synthesis of diene polymers, which process is also the subject matter of the present invention. This is because it turns out that the bimetallic catalytic system used in such a process makes possible simplified management of the process, in comparison with processes of the prior art employing a trimetallic catalytic system. In addition, the bimetallic catalytic system according to the invention promotes the trans-1,4 insertion of conjugated diene monomers, thus making it possible to obtain diene polymers exhibiting a higher content of trans-1,4 sequences than those obtained with a conventional polymerization initiator based on an organic compound of an alkali metal, such as lithium. Furthermore, the process of synthesis using a bimetallic catalytic system according to the invention also makes it possible to limit the 1,2 insertion of the conjugated diene monomers. It turns out that, in some uses of a diene polymer, it can be advantageous for the latter to have not only a high content of trans-1,4 sequences but also a limited content of 1,2 sequences. A process for the synthesis of diene polymers which makes it possible to satisfy these two objectives simultaneously is particularly advantageous.

Another subject matter of the invention is thus a process for the synthesis of a diene polymer comprising a stage of anionic polymerization of at least one diene monomer in the presence of a bimetallic catalytic system as described above.

Suitable as diene monomer in accordance with the invention is a conjugated diene monomer. Mention may very particularly be made of a 1,3-diene monomer. Mention may very particularly be made, as 1,3-diene monomer in accordance with the invention, of 1,3-diene monomers having from 4 to 15 carbon atoms.

Suitable in particular as conjugated diene are 1,3-butadiene, isoprene, 2,3-di($C_1$ to $C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, phenyl-1,3-butadiene, 1,3-pentadiene, or any other conjugated diene 1,3-diene monomer having from 4 to 12 carbon atoms, particularly having from 4 to 8 carbon atoms.

Also suitable as 1,3-diene monomer is any acyclic terpene, such as, in particular, an acyclic monoterpene $(C_{10}H_{16})$, such as myrcene, an acyclic sesquiterpene $(C_{15}H_{24})$, such as farnesene, and the like.

According to certain embodiments of the invention, the diene monomer is 1,3-butadiene or isoprene, advantageously 1,3-butadiene.

According to certain embodiments of the invention, the polymerization stage of the process is a stage of homopolymerization of a diene monomer in the presence of a bimetallic catalytic system as described above.

According to certain embodiments of the invention, the polymerization stage of the process is a stage of copolymerization of at least one diene monomer in the presence of a bimetallic catalytic system as described above. The diene monomer is then copolymerized with at least one other monomer.

Suitable in particular as one other monomer is a diene monomer as defined above, other than the first diene monomer.

Also suitable as one other monomer is a vinylaromatic compound. Mention may be made, as vinylaromatic monomer, of a vinylaromatic monomer having from 8 to 20 carbon atoms, such as, for example, styrene, ortho-, meta- or para-methylstyrene, 2,4,6-trimethylstyrene, divinylbenzene and vinylnaphthalene; preferably, the vinylaromatic monomer is styrene.

According to certain embodiments of the invention, the polymerization stage of the process is a stage of polymerization of 1,3-butadiene in the presence of a bimetallic catalytic system as described above.

According to certain embodiments of the invention, the polymerization stage of the process is a stage of copolymerization of 1,3-butadiene and styrene in the presence of a bimetallic catalytic system as described above.

According to certain embodiments of the invention, the polymerization stage of the process is a stage of polymerization of 1,3-butadiene in the presence of a bimetallic catalytic system consisting of the metallic components of formulae RLi and $Ca(AR'_y)_2(L)_x$ in which at least one, at least two, at least three, preferably all, of the following characteristics are observed:

R represents an n-butyl or s-butyl, preferably s-butyl, radical,

A represents a nitrogen atom N and y has the value 2, and

R' is a trimethylsilyl, triethylsilyl or tripropylsilyl, preferably trimethylsilyl, radical, the Ca/Li molar ratio is at least 0.2 and at most 1.0, preferably at most 0.8.

According to these embodiments of the invention, the polymerization stage of the process is a stage of polymerization of 1,3-butadiene in the presence of a bimetallic catalytic system consisting of the metallic components of formulae RLi and $Ca(AR'_y)_2(L)_x$ in which all the following characteristics are observed:

R represents an n-butyl or s-butyl, preferably s-butyl, radical,

A represents a nitrogen atom N and y has the value 2, and

R' is a trimethylsilyl, triethylsilyl or tripropylsilyl, preferably trimethylsilyl, radical, the Ca/Li molar ratio is at least 0.2 and at most 1.0, preferably at most 0.8.

The polymerization stage can be carried out in a known manner, continuously or batchwise, generally and in a known manner at a temperature ranging from 15° C. to 120° C.

The polymerization stage can be carried out in an organic solvent conventionally used for the polymerization of diene monomers. According to the invention, the term "organic solvent" is understood to mean an inert hydrocarbon solvent which can, for example, be an aliphatic or alicyclic hydrocarbon, such as pentane, hexane, heptane, isooctane, cyclohexane or methylcyclohexane, or an aromatic hydrocarbon, such as benzene, toluene or xylene, or mixtures of these solvents. It should be noted that nonaromatic solvents are particularly preferred.

The bimetallic catalytic system used in the process for the synthesis of a diene polymer according to the invention is as described above according to all its embodiments.

The bimetallic catalytic system according to the invention can be prepared by addition of the constituents of the catalytic system directly to the polymerization solvent containing the monomer(s) to be polymerized (in situ preparation). The constituents of the bimetallic catalytic system can be added at the same time or one after the other. In the latter scenario, the calcium-based cocatalyst can be added first. The organic alkali metal compound is subsequently added.

Alternatively, the calcium-based cocatalyst can, in a first step, be mixed with the monomers to be polymerized. The organic alkali metal compound is subsequently added in order to lead to the polymerization reaction.

Alternatively again, the bimetallic catalytic system according to the invention can be prepared by premixing the constituents of the catalytic system before being brought into contact with the solvent containing the monomer(s) to be polymerized. The constituents of the bimetallic catalytic system are then introduced into an inert hydrocarbon solvent, over a time of between 0 and 120 minutes, at a temperature ranging from 10° C. to 120° C., advantageously greater than ambient temperature, so as to obtain a premixed catalyst. The premixed catalyst thus obtained is subsequently brought into contact with the solvent containing the monomer(s) to be polymerized.

According to the latter alternative, the bimetallic catalytic system is typically prepared in a low-molecular-weight hydrocarbon solvent, such as, for example, cyclohexane, methylcyclohexane, n-heptane or a mixture of these solvents, preferably in n-heptane, or also in an aromatic solvent, such as toluene. It should be noted that nonaromatic solvents are particularly preferred. The constituents of the bimetallic catalytic system can be added as follows. In a first stage, the calcium-based cocatalyst is added to the solvent. In a second stage, the organic alkali metal compound is added. The constituents of the bimetallic catalytic system can alternatively be added as follows.

In a first stage, the organic alkali metal compound is added to the solvent. In a second stage, the calcium-based cocatalyst is added.

According to certain embodiments of the invention, the polymerization stage of the process is preceded by a stage of neutralization of the impurities in the reaction medium. This stage is conventional in anionic polymerization and can be carried out in a manner known per se, in particular by adding an organolithium compound, such as an alkyllithium, directly to the reaction medium.

On conclusion of the polymerization stage, the process for the synthesis of a diene polymer according to the invention can be continued in a manner known per se. Thus, in certain embodiments, the polymerization can be halted, optionally after a stage of postpolymerization modification of the diene polymer.

The process is subsequently continued in a manner known per se by the separation and recovery of the diene polymer prepared. The unreacted monomers and/or the solvent can be removed, according to methods known to a person skilled in the art.

A better understanding of the abovementioned characteristics of the present invention, and also others, will be obtained on reading the following description of several exemplary embodiments of the present invention, given by way of indication and without limitation.

EXAMPLES

Measurements and Tests Used

Near-Infrared (NIR) Spectroscopy

The microstructure of the elastomers is characterized by the near-infrared (NIR) spectroscopy technique.

Near-infrared (NIR) spectroscopy is used to quantitatively determine the content by weight of styrene in the elastomer and also its microstructure (relative distribution of the 1,2-, trans-1,4- and cis-1,4-butadiene units). The principle of the method is based on the Beer-Lambert law generalized for a multicomponent system. As the method is indirect, it involves a multivariate calibration [Vilmin, F., Dussap, C. and Coste, N., Applied Spectroscopy, 2006, 60, 619-29] carried out using standard elastomers having a composition determined by $^{13}$C NMR. The microstructure is then calculated from the NIR spectrum of an elastomer film approximately 750 μm in thickness. The spectrum is acquired in transmission mode between 7800 and 3900 cm[−1] with a resolution of 2 cm[−1] using a Fourier-transform near-infrared spectrometer equipped with an InGaAs detector cooled by the Peltier effect.

Conversion

The conversion is calculated via the ratio of the weight of the polymer isolated at the end of the reaction to the weight of butadiene introduced into the reactor.

$$C = \frac{W_{polybutadiene}}{W_{butadiene}} \cdot 100$$

$W_{butadiene}$ which represents the weight of butadiene introduced into the reactor, $W_{polybutadiene}$ which represents the weight of polybutadiene obtained.

Synthesis of Calcium Bis(Trimethylsilyl)Amide

The synthesis of the calcium amine salt was carried out according to a procedure described in A. M. Johns, S. C. Chmely and T. P. Hanusa, "Solution Interaction of Potassium and Calcium Bis(trimethylsilyl)amides; Preparation of Ca[N(SiMe$_3$)$_2$]$_2$ from Dibenzylcalcium," *Inorg. Chem.*, Vol. 48, No. 4, pp. 1380-1384, 2009.

Synthesis of Benzylpotassium

A solution of potassium tert-pentoxide (0.18 M in cyclohexane, 100 ml) was brought to dryness and 80 ml of toluene were added. During the addition at 0° C. of sec-butyllithium (1.4 M in cyclohexane, 13 ml), the formation of an orange precipitate is observed. The mixture was subsequently allowed to react for another hour at 20° C. The dispersion was subsequently filtered under an inert atmosphere and the resulting solid was washed with dry toluene (2×20 ml) and dry heptane (2×20 ml) to obtain 1.5 g of benzylpotassium (yield=63%).

Synthesis of Dibenzylcalcium

Calcium iodide (2.2 g) was vigorously stirred in dry THF (22 ml) overnight in order to obtain a calcium iodide dispersion. A solution of benzylpotassium (1.5 g) in dry THF (20 ml) was added dropwise to this dispersion, producing a pale yellow dispersion. This mixture was left to react overnight at 20° C. before filtration through celite (flame-dried under vacuum) to remove the KI and the unreacted CaI$_2$. The solution obtained was dried under reduced pressure, resulting in a red oily substance. Subsequent treatment in toluene (50 ml) with addition of pentane (50 ml) produced a fine orange dispersion. After filtration and washing with heptane (2×20 ml), 1.41 g of dibenzylcalcium were obtained (yield=50%).

Synthesis of Calcium Bis(Trimethylsilyl)Amide 2.5 ml of dry hexamethyldisilazane were added to a dispersion of dibenzylcalcium (1.30 g) in toluene (15 ml).

After 4 hours at 60° C., filtration through celite (flame-dried under vacuum) under an inert atmosphere gives a clear solution which was dried under reduced pressure overnight, resulting in 1.43 g of calcium bis(trimethylsilyl)amide. During the addition of dry toluene (30 ml), the amine salt proved to be insoluble. Another filtration through celite under inert conditions gave a clear solution, and that calcium bis(trimethylsilyl)amide had been obtained was confirmed by $^1$H NMR in d$_6$-benzene and the concentration was 0.135 M (evaluated by titration with HCl/phenolphthalein) (yield=70%).

Polymerizations of 1,3-Butadiene Using the Bimetallic Catalyst System Comprising Sec-Butyllithium and Calcium Bis(Trimethylsilyl)Amide Anionic polymerization under vacuum was carried out as follows: a high pressure glass reactor equipped with a magnetic stirrer and equipped with PTFE stopcocks was flame dried under vacuum, 10 ml of cyclohexane were added through connected glass tubes, sec-butyllithium (71 μl, 1.4 M in cyclohexane) and an appropriate volume of 2 M calcium bis(trimethylsilyl)amide solution in cyclohexane were added via a syringe under a stream of argon. Subsequently, a known amount of 1,3-butadiene (1.10 ml, 1 g) was added under vacuum using a graduated burette. Polymerization was allowed to continue at the temperature indicated for the time necessary to obtain a conversion of the monomers of greater than or equal to 80%. Polymerization is subsequently halted by addition of degassed methanol. The solvent was evaporated under vacuum and the polymer was subsequently dried to constant weight.

TABLE 1

| [Ca]/[Li] Molar ratio | Temperature | Conversion (%) | trans-1,4 (%) | cis-1,4 (%) | 1,2 (%) |
|---|---|---|---|---|---|
| 0 | 20° C. | 100 | 52 | 41 | 7 |
| 0.1 | 20° C. | 100 | 49 | 40 | 10 |
| 0.2 | 40° C. | 83 | 54 | 38 | 8 |
| 0.4 | 20° C. | 100 | 69 | 22 | 9 |
| 0.7 | 20° C. | 100 | 75 | 17 | 8 |
| 1.0 | 20° C. | 80 | 76 | 15 | 9 |

It is found that the use of bimetallic catalytic systems according to the invention based on sec-butyllithium/calcium bis(trimethylsilyl)amide produces polybutadiene exhibiting a content of trans-1,4 sequences which is greater than the content of trans-1,4 sequences obtained with sec-butyllithium used alone in a [Ca]/[Li] molar ratio range varying from 0.2 to 1.0. This content of trans-1,4 sequences increases until a plateau maximum value is obtained when the [Ca]/[Li] molar ratio reaches 0.7.

Furthermore, it is found that, when the [Ca]/[Li] molar ratio varies from 0.1 to 1.0, stereoregular trans-1,4 polybutadienes with a limited content of 1,2 sequences not exceeding 10% by weight are obtained.

The invention claimed is:

1. A bimetallic catalytic system consisting of the metallic components of formulae:

RLi and Ca(AR'$_y$)$_2$(L)$_x$ in which:

R represents a substituted or unsubstituted C$_1$-C$_{10}$ aliphatic radical, a substituted or unsubstituted C$_6$-C$_{20}$ aromatic radical, a diene prepolymer or a substituted or unsubstituted C$_1$-C$_{10}$ heteroaliphatic radical;

A denotes a nitrogen atom N or a carbon atom C;

y depends on the valency of A and has the value 2 when A is N and the value 3 when A is C;

each R' represents, independently of one another, a substituted or unsubstituted $C_5$-$C_{10}$ aliphatic radical, a substituted or unsubstituted $C_6$-$C_{20}$ aromatic radical, a substituted or unsubstituted silyl radical, a $C_1$-$C_{10}$ aliphatic radical substituted by at least one substituted or unsubstituted silyl radical, a $C_6$-$C_{20}$ aromatic radical substituted by at least one substituted or unsubstituted silyl radical;

L represents a ligand; and x is a number ranging from 0 to 4.

2. The bimetallic catalytic system as claimed in claim 1, wherein the aliphatic radical, in the definition of R, is a $C_1$-$C_4$ alkyl radical.

3. The bimetallic catalytic system as claimed in claim 1, wherein the prepolymer, in the definition of R, is a polybutadiene or a polyisoprene.

4. The bimetallic catalytic system as claimed in claim 1, wherein the heteroaliphatic radical, in the definition of R, is a heteroaliphatic radical comprising one or more nitrogen atoms.

5. The bimetallic catalytic system as claimed in claim 1, wherein A represents a nitrogen atom and y has the value 2.

6. The bimetallic catalytic system as claimed in claim 1, wherein the silyl radical, in the definition of R', is a silyl radical substituted by at least one $C_1$-$C_5$ alkyl, $C_3$-$C_6$ cycloalkyl, $C_6$-$C_{10}$ aryl or $C_7$-$C_{12}$ aralkyl radical.

7. The bimetallic catalytic system as claimed in claim 1, wherein R' is a silyl radical substituted by three $C_1$-$C_5$ alkyl radicals.

8. The bimetallic catalytic system as claimed in claim 1, wherein the ligand L is selected from the group consisting of ethers.

9. The bimetallic catalytic system as claimed in claim 1, wherein at least one, at least two or all of the following characteristics are observed:

R represents a $C_1$-$C_4$ alkyl radical;

A represents a nitrogen atom and y has the value 2; and each R' represents a silyl radical substituted by three $C_1$-$C_5$ alkyl radicals.

10. The bimetallic catalytic system as claimed in claim 1, wherein a molar ratio of $Ca(AR'_y)_2(L)_x$ to RLi (or of Ca to Li) is at least 0.2.

11. The bimetallic catalytic system as claimed in claim 1, wherein a molar ratio of $Ca(AR'_y)_2(L)_x$ to RLi (or of Ca to Li) is at least 0.2 and at most 1.0.

12. A process for the synthesis of a diene polymer comprising a stage of anionic polymerization of at least one diene monomer in the presence of the bimetallic catalytic system as claimed in claim 1.

13. The process as claimed in claim 12, wherein the diene monomer is 1,3-butadiene or isoprene.

14. The process as claimed in claim 12, wherein the diene monomer is copolymerized with at least one other monomer selected from the group consisting of vinylaromatic compounds.

\* \* \* \* \*